United States Patent [19]

Whipple

[11] Patent Number: 4,496,122

[45] Date of Patent: Jan. 29, 1985

[54] EXTENDED MOMENT ARM ANTI-SPIN DEVICE

[75] Inventor: Raymond D. Whipple, Newport News, Va.

[73] Assignee: The United States of America as represented by the Administrator of the National Aeronautics and Space Administration, Washington, D.C.

[21] Appl. No.: 508,371

[22] Filed: Jun. 27, 1983

[51] Int. Cl.³ .............................................. B64C 17/00
[52] U.S. Cl. .................. 244/75 R; 244/139; 244/147
[58] Field of Search .............. 244/138 R, 139, 147, 244/75 R, 113, DIG. 1

[56] References Cited

U.S. PATENT DOCUMENTS

| | | |
|---|---|---|
| 1,331,705 | 2/1920 | Greenfield .......................... 244/147 |
| 1,433,395 | 10/1922 | Marshall . |
| 1,457,044 | 5/1923 | Sherry . |
| 1,972,967 | 9/1934 | Zahodiakin ......................... 244/139 |
| 2,411,077 | 11/1946 | Andreopoulos et al. . |
| 2,433,952 | 1/1948 | Hines . |
| 2,972,457 | 2/1961 | Steinthal . |
| 3,058,702 | 10/1962 | Sharples et al. . |
| 3,129,912 | 4/1964 | Smith . |
| 3,362,289 | 1/1968 | Guin . |
| 3,419,234 | 12/1968 | Poirier . |
| 3,930,628 | 1/1976 | Robelen ............................. 244/139 |
| 4,040,583 | 8/1977 | Bihrle . |
| 4,108,402 | 8/1978 | Bowen ............................... 244/147 |

FOREIGN PATENT DOCUMENTS 2069425 8/1981 United Kingdom .

*Primary Examiner*—Galen L. Barefoot
*Attorney, Agent, or Firm*—Howard J. Osborn; John R. Manning

[57] ABSTRACT

A device which corrects aerodynamic spin wherein a collapsible boom 42 extends an aircraft moment arm and an anti-spin parachute force 24 is exerted upon the end of the moment arm to correct intentional or inadvertent aerodynamic spin. This configuration effects spin recovery by means of a parachute 30 whose required diameter 32 decreases as an inverse function of the increasing length of the moment arm. The collapsible boom 42 enables the parachute 30 to avoid the aircraft wake 50 without mechanical assistance, retracts to permit steep takeoff, and permits a parachute 30 to correct spin while minimizing associated aerodynamic, structural and in-flight complications.

4 Claims, 5 Drawing Figures

EXTENDED MOMENT ARM ANTI-SPIN DEVICE

ORIGIN OF THE INVENTION

The invention described herein was made by an employee of the United States Government and may be used by or for the Government for governmental purposes without the payment of any royalties thereon or therefor.

INTRODUCTION

Military aircraft are routinely tested to identify the types of spins which might be encountered during operational flights. The spin most difficult to correct is the flat spin, in which the aircraft rotates about its center of mass in a somewhat nose down position which approaches the horizontal "spinning top" configuration. In the event that ordinary aerodynamic controls are inadequate to stop the spin, an anti-spin parachute (or other anti-spin force) provides emergency correction.

The present invention was developed to permit equivalent correction of flat spins as accomplished by existing devices, but which would also maximize flight test accuracy, safety, efficiency and structural simplicity of the anti-spin parachute and its associated aircraft.

BACKGROUND OF THE INVENTION

With prior art arrangements, flat spins were commonly corrected by a parachute deployed from the rear of the aircraft. The parachute created an anti-spin torque by exerting a force, opposite to the spin, through the moment arm extending from the aircraft center of mass to the point of chute attachment. These anti-spin parachutes were frequently installed for use during flight testing of the aircraft, but their installation not only introduced error into the results of those flight tests, but created so many design problems that the chutes were seldom incorporated into operational fighter or commercial planes. The large diameter parachutes and long towlines required stowage compartments in the rear fuselage, and the compartments produced undesirable deviations from the production contours of the aircraft. The large chute forces, in addition, required substantial structural reinforcement of the aircraft to enable it to withstand the high design load of the chute, and such reinforcements altered the mass distribution of the aircraft and its subsequent flight test performance.

Conventional rear deployed anti-spin parachutes created three other problems as well. The parachutes required mechanisms, usually pyrotechnic, to eject the chute beyond the wake of the spinning aircraft. All of these mechanisms required special attention and the explosive devices were potentially unsafe. In addition, even when properly functional, the devices did not prevent the chute from re-entering the wake and such re-entry caused partial or total parachute collapse. Finally, the chutes created so much drag that flight after spin recovery was impossible as long as the chute was in place, and redundant mechanisms to ensure chute release were required.

OBJECTS OF THE INVENTION

Accordingly, it is an object of the present invention to provide a fixed or retractable structure anchored to the aircraft, the function of which is to provide an extended moment arm through which a parachute or other device may exert its anti-spin torque.

Another object of the invention is to provide a means whereby equivalent spin correction may be accomplished by a parachute whose required diameter decreases as an inverse function of the increasing length of the moment arm, wherein the diameter is less than one-half of the diameter that would be necessary were the parachute attached to the rear of the fuselage.

A further object of the invention is to provide a means for correcting spin which incorporates a parachute, the size of which will minimize or eliminate need for a stowage compartment whose dimensions alter the production contours of the aircraft.

Still another object of the invention is to provide a means for correcting spin which incorporates a parachute, the chute load of which will minimize or eliminate the necessity of structural reinforcement of the aircraft.

Yet another object of the invention is to provide a means for correcting spin which incorporates a parachute, the chute drag of which will not make further aircraft operation impossible in the event of misfunction of the parachute release mechanism, thus eliminating the necessity of redundant parachute release mechanisms.

A further object of the invention is to provide a retractable mechanism for correcting spin which may be partially or totally housed within the rear fuselage in order to preserve the aerodynamic design of the aircraft and to permit unimpeded rotation upon steep takeoff.

A still further object of the invention is to provide extended means from which the anti-spin parachute is deployed, permitting deployment of the parachute exterior to the wake of the spinning aircraft without necessity of additional means, pyrotechnic or otherwise, to avoid the aircraft wake.

Yet another object of the invention is to provide a mechanism to maintain inflation of the parachute by preventing its re-entry into the aircraft wake.

A still further object of the invention is to provide a parachute of a size simultaneously appropriate for use as an anti-spin parachute and as a drag parachute (decelerating device).

The foregoing and additional objects are attained by providing a device to correct aerodynamic flat spin comprising an extension of the moment arm of the aircraft permitting an associated force, such as a parachute, to exert its anti-spin torque on the aircraft by means of the extended moment arm. This configuration permits equivalent spin correction with a parachute whose required diameter decreases as an inverse function of the increasing length of the moment arm. The extension enables the parachute to avoid the aircraft wake without mechanical assistance, retracts to permit steep takeoff, and permits a parachute to correct spin while minimizing associated aerodynamic, structural and in-flight complications.

Other objects and advantages of the present invention will be more readily apparent to those skilled in the art as the same becomes better understood with reference to the following description and drawings.

DETAILED DESCRIPTION OF THE INVENTION

Figure 1:
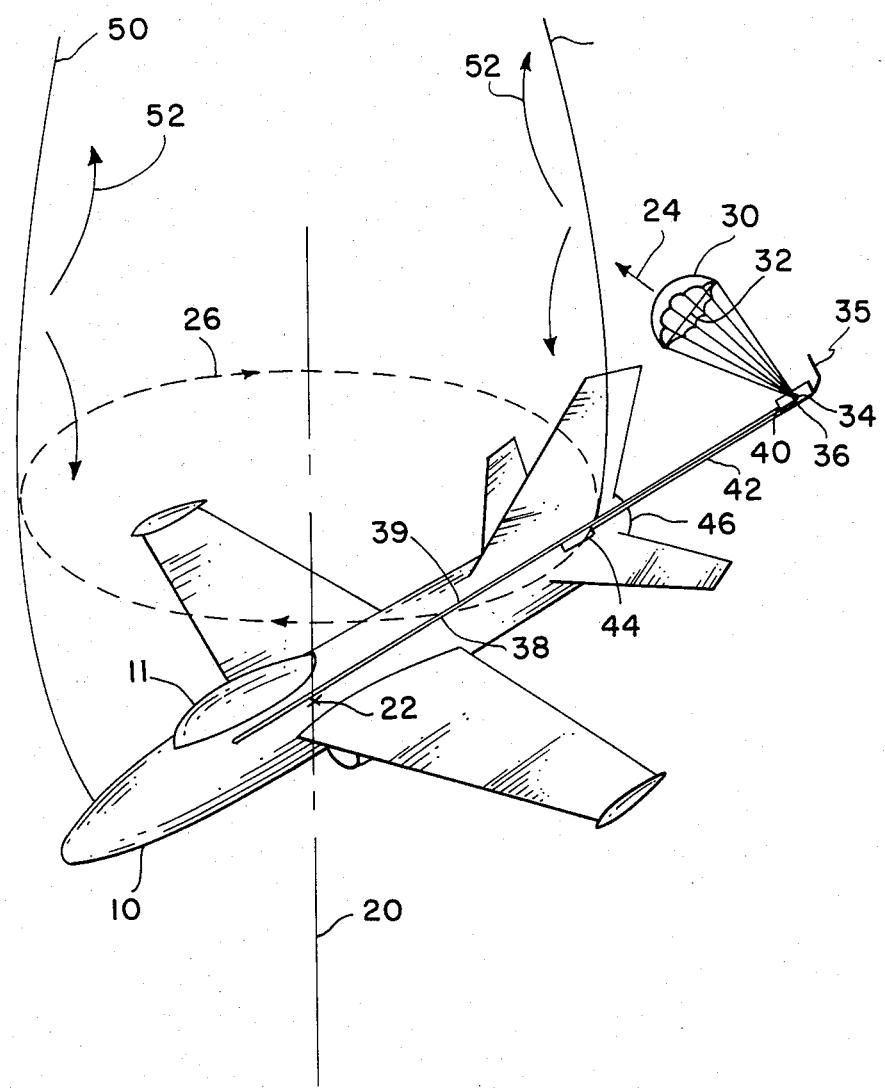
FIG. 1 is a perspective view of the invention in which the parachute is shown exerting its force opposite to the direction of the spin.
Figure 2:
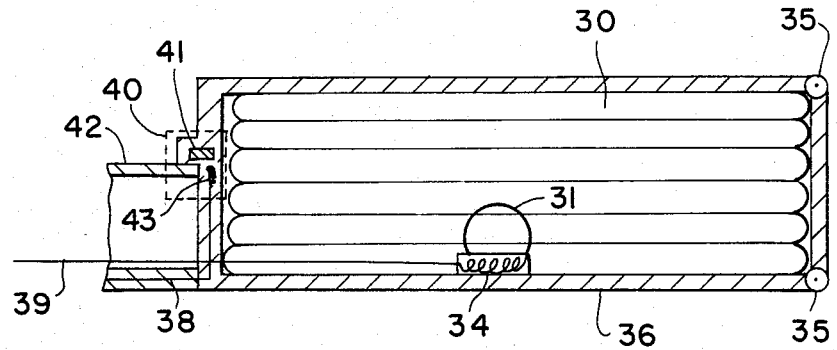
FIG. 2 is a cross-sectional view of the parachute housing before parachute deployment.
Figure 3:
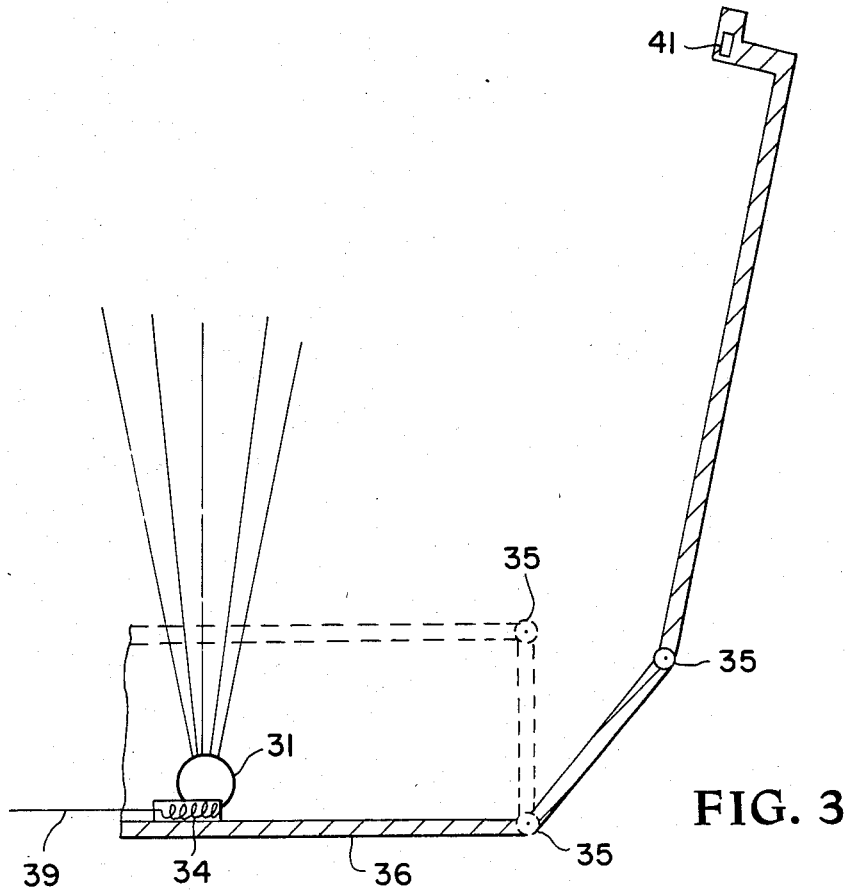
FIG. 3 is a cross-sectional view of the parachute housing after parachute deployment.

Referring now to the drawings and initially to FIG. 1, a test aircraft 10 has intentionally or inadvertently encountered an aerodynamic spin; the descending aircraft rotates about the vertical spin axis 20 through the aircraft center of mass 22. The invention permits a parachute force 24 to act through a collapsible boom 42 to oppose the direction of spin 26 to allow the pilot to recover and resume normal flight. The preferred embodiment of the invention includes a nylon parachute 30 of a diameter 32, releasably attached to a spring clamp 34 within parachute housing 36. FIG. 2 illustrates a cross-section of the parachute housing 36, prior to parachute deployment, which consists essentially of a four-sided aluminum box housing the parachute 30; the box is open on two sides and hinged at each of its upper and lower outboard edges by housing hinges 35. The spring clamp 34 is anchored to the parachute housing 36 and clamps through the parachute ring 31 to secure it. A parachute housing latch area 40 contains the mechanism by which the parachute housing 36 is latched or unlatched. The parachute housing latch area 40 includes a magnetic plate 41 embedded in the lid of parachute housing 36; the magnetic plate is positioned opposite to an electromagnet 43 whose current is supplied via housing latch control line 38. The electromagnet 43 remains inactivated throughout ordinary aircraft operation, but may be energized from the cockpit 11, in the event of spin, by the connecting parachute housing control line 38. The process whereby the parachute housing 36 is unlatched is described in Operation below. Because the electromagnet 43 initially has no charge, the magnetic plate 41 attracts the steel surface of the electromagnet 43 to hold parachute housing 36 in its initial closed position. FIG. 3 is a partial illustration of the parachute housing 36 in its open position.

Referring again to FIG. 1, the collapsible boom 42 extends beyond the rear fuselage 46 to support the parachute housing 36; the boom 42 supports the parachute housing 36 and provides protection for those sections of housing latch control line 38 and parachute release line 39 which extends beyond the aircraft 10. The parachute release line 39 connects the spring clamp 34 to the cockpit 11 in order that the parachute ring 31 may be selectively held in place. The collapsible boom 42 is rigid when fully extended, but is retractable by means of the retraction/stowage mechanism 44 located within the rear fuselage. Representative structure of a collapsible boom and retraction/stowage mechanism 44 is disclosed in U.S. Pat. No. 4,259,825, to Hedgepeth et al, in which a foldable beam is extended from and retracted to a cylindrical repository. When extended, collapsible boom 42 extends beyond the aircraft wake 50, said wake resulting from the aggregate local air flows 52 created above the aircraft by the spin.

The structure of the alternate embodiment of the invention differs only in that retraction/stowage mechanism 44 is omitted and boom 42 is rigid in construction and fixed directly to the rear fuselage of the aircraft 10. Parachute 30, parachute housing 36 and all associated control devices are identical to those of the preferred embodiment of the invention.

OPERATION

Figure 4:
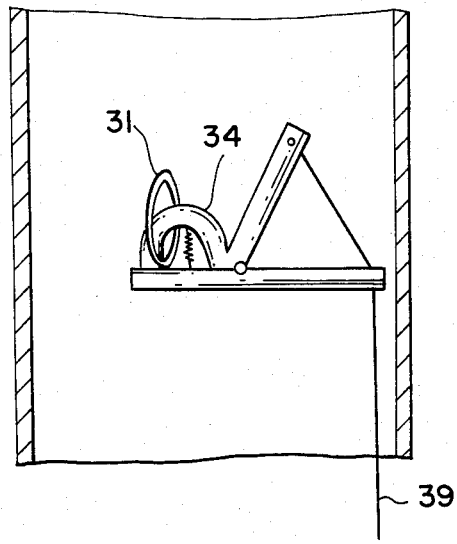
FIG. 4 is an elevational view of the spring clamp in a closed position before parachute release.
Figure 5:
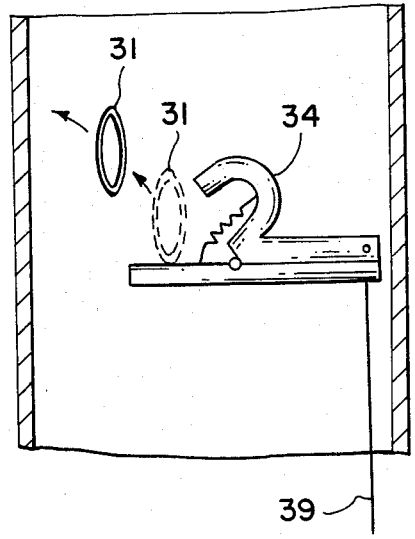
FIG. 5 is an elevational view of the spring clamp in an open position after parachute release.

Under normal circumstances, aircraft 10 operates without need of an emergency anti-spin device. For this reason, during ordinary flight, collapsible boom 42 is maintained in its collapsed state and stored by means of retraction/stowage mechanism 44 (FIG. 1). Parachute 30 is packed within parachute housing 36 and parachute housing latch area 40 is firmly secured due to the attraction of the magnetic plate 42 for the uncharged electromagnet 43 (FIG. 2). In the event that the aircraft encounters an aerodynamic spin, the pilot extends the collapsible boom 42 (FIG. 1) by activating the retraction/stowage mechanism 44. After boom 42 is fully extended, the pilot activates the electromagnet 43 by means of housing latch control line 38 to create an electromagnet 43 like in polarity to the magnetic plate 41. As shown in FIGS. 2 and 3, the like polarities repel each other and the parachute housing 36 opens. The freestream air continues to open parachute housing 36 by rotating housing hinges 35. The freestream air also inflates the parachute 30. As the parachute inflates, it exerts a parachute force 24 opposite to the direction of the spin 26 (FIG. 1), thus correcting the spin. After the spin is corrected, the pilot releases the parachute 30 by opening the spring clamp 34 via parachute release line 39 to release parachute ring 31 as shown in FIGS. 4 and 5. No redundant release mechanism is provided; the parachute 30 does not create sufficient drag to prevent further aircraft flight in the event that the release of parachute 30 becomes impossible. The boom 42 is not retracted until after landing; any test or operational aircraft, which has just recovered from an emergency spin situation will almost invariably land promptly, obviating the necessity for the in-flight retraction of the boom. As the aircraft 10 is readied for its next flight, the parachute 30 is repacked into parachute housing 36, the inactivated electromagnet 43 is recoupled with magnetic plate 41, and boom 42 is retracted into the rear fuselage 46.

Operation of the alternate embodiment of the invention is identical to the preferred embodiment except that rigid boom 42 is fixed to the rear fuselage and is neither extended before spin correction nor retracted after landing. Parachute 30 and all associated structures operate as described above.

The present invention extends the moment arm through which a parachute or other device exerts its anti-spin force. The moment arm of a conventional anti-spin parachute extends from the aircraft center of mass 22 to the tip of rear fuselage 46; the extended moment arm of the present invention originates at the aircraft center of mass 22, but extends the length of collapsible boom 42 to its termination at spring clamp 34. The collapsible boom, therefore, extends the moment arm by an amount approximately equal to its own length and permits a relatively smaller parachute to exert the same anti-spin torque as a conventional rear-deployed parachute.

The effectiveness of the present invention is best illustrated by actual comparison of its chute load with that required by a conventional anti-spin parachute. The actual embodiment of the invention described above accomplished spin recovery in 13 turns of the aircraft; a conventional anti-spin parachute accomplished recovery in 14 turns but entailed more than seven times the calculated parachute load as did the present invention. The dimensions and calculations for each respective device are provided below.

The test model of the preferred embodiment of the invention included a fighter aircraft with a distance from the center of mass to the tip of the rear fuselage of 22 ft.; the collapsible boom measured 9 ft. after full extension and increased the parachute moment arm to 31 ft. The 9.4 ft. parachute diameter determined the chute force by the equation $F=C_D qS$, where F is the parachute load or force, $C_D$ is the drag coefficient of the specific Nylon parachute employed, q is the freestream velocity of the descending aircraft and S is the parachute area calculated by one-half diameter$^2\pi$. Under actual test conditions, the 9.4 ft. diameter parachute exerted a calculable force of 3100 lbs. The invention exerted an anti-spin torque, therefore, of 3100 lbs.$\times$31 ft., or 96,100 ft-lbs., and spin recovery was complete after 13 turns of the aircraft.

The conventional anti-spin parachute accomplished spin recovery in 14 aircraft turns and comprised a fighter aircraft with a distance from the center of mass to the tip of the rear fuselage of 22 ft.; the parachute was attached to the tip of the rear fuselage by means of a nylon cord 74 ft. long. The parachute diameter was 26 ft. and the calculated chute load was 23,500 lbs. under identical test conditions. The parachute, therefore, created a torque of 23,500 lbs.$\times$22 ft., or 517,000 ft-lbs.—approximately 5 times as much torque as was necessary with the present invention for a substantially equivalent spin recovery.

The relatively smaller parachute force of the present invention minimizes chute load on the structural components of the aircraft and reduces or eliminates the necessity of structural reinforcements. The lesser chute drag does not make further flight impossible in the event of failure of the parachute release mechanism of the spin correction. The smaller parachute has a smaller surface area and requires less storage space than did the conventional spin chutes and their long flexible towlines; the smaller chute minimizes or eliminates the need for bulky stowage compartments which alter the production contours of the aircraft.

The invention deploys the parachute outside of the aircraft wake and keeps it from collapsing back into the wake; the lengthened moment arm permits a relatively smaller parachute to accomplish equivalent spin recovery. Finally, whereas conventional spin chutes are generally employed only on test aircraft, any aircraft equipped with the present device as its drag chute will automatically be equipped with an anti-spin parachute as well.

Various changes may be made in the shape, size and arrangement of parts without departing from the spirit or scope of the invention. For example, a device other than a parachute may be installed at the outboard end of the rigid boom if such a device is capable of creating an effective anti-spin force. In addition, a parachute with a flexible towline of a suitable length can be deployed from the rigid boom in the same manner as the simple parachute shown in FIG. 1. These and other applications of the present invention will be readily apparent to those skilled in the art in light of the above teachings. It is therefore to be understood that the invention may be practiced otherwise than as specifically described and claimed herein.

What is claimed as new and desired to be secured by Letters Patent of the United States is:

1. A device which corrects aerodynamic spin during aircraft operation comprising:
   an aircraft;
   extendable boom means housed completely within the aircraft;
   said extendable boom means forming an extension of an anti-spin moment arm of said aircraft when extended from the tail of the aircraft;
   parachute means carried by said extendable boom means at the end thereof remote from the aircraft;
   means for deploying said parachute means for exerting an anti-spin force at the end of said moment arm;
   said parachute means having a diameter and said extendable boom means having a length permitting relative reduction in parachute size necessary to accomplish spin correction and continued flight of the aircraft without release of the parachute means.

2. The combination as in claim 1 wherein said extendable boom means includes means for extending and retracting whereby preservation of the aerodynamic design of the aircraft is maximized.

3. The combination as in claim 1 wherein said parachute means is of a diameter determined as an inverse function of the total length of the moment arm, whereby a longer moment arm permits a relative reduction in the chute size necessary to accomplish equivalent spin correction.

4. The combination as in claim 1 wherein said extendable boom means is a rigid boom, said boom extending and maintaining said parachute means beyond the wake of said aircraft and including means for housing said parachute means at the end of the boom remote from the aircraft.

* * * * *